United States Patent
Sinha et al.

(10) Patent No.: US 12,147,438 B2
(45) Date of Patent: Nov. 19, 2024

(54) API REPOSITORY WITH SEARCHABLE FEATURE SET

(71) Applicant: International Business Machines Corporation, Armonk, NY (US)

(72) Inventors: Sarika Sinha, Bangalore (IN); Siddharth Saraya, New Delhi (IN); Pradeep Kumar Rathi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 18/092,360

(22) Filed: Jan. 2, 2023

(65) Prior Publication Data

US 2024/0220507 A1    Jul. 4, 2024

(51) Int. Cl.
  *G06F 16/2457* (2019.01)
  *G06F 9/54* (2006.01)
  *G06F 16/248* (2019.01)

(52) U.S. Cl.
  CPC .......... *G06F 16/24578* (2019.01); *G06F 9/54* (2013.01); *G06F 16/248* (2019.01)

(58) Field of Classification Search
  CPC ..... G06F 16/24578; G06F 16/248; G06F 9/54
  See application file for complete search history.

(56) References Cited

U.S. PATENT DOCUMENTS

| | | | |
|---|---|---|---|
| 10,678,679 B1 * | 6/2020 | Sonawale | G06F 11/3684 |
| 10,776,180 B1 * | 9/2020 | Ma | G06F 9/541 |
| 11,228,573 B1 * | 1/2022 | Rangasamy | H04L 12/40006 |
| 11,922,239 B1 * | 3/2024 | Vasudevan | G06F 9/547 |
| 2016/0239546 A1 | 8/2016 | Cuomo et al. | |
| 2018/0129544 A1 | 5/2018 | Ekambaram et al. | |
| 2019/0384856 A1 * | 12/2019 | Liu | G06F 40/284 |
| 2020/0159597 A1 * | 5/2020 | Gino | G06F 16/24539 |
| 2020/0226185 A1 * | 7/2020 | Yan | H04L 67/02 |
| 2020/0371851 A1 * | 11/2020 | Liu | G06F 8/62 |
| 2021/0216443 A1 * | 7/2021 | Park | G06F 11/3688 |

FOREIGN PATENT DOCUMENTS

| | | |
|---|---|---|
| CN | 106250391 A | 12/2016 |
| CN | 110297628 A | 10/2019 |

OTHER PUBLICATIONS

Cunha et al., A Platform-as-a-Service API Aggregator, published in Advances in Information Systems and Technologies, Jan. 2013.
Unknown, OpenAPIHUB, published in Openapihub.com, https://www.openapihub.com/en-us/?utm_campaign=oah-search-generic-en-hk-220122&utm_content=geterm220122&utm_medium=cpc&utm_source=google&gclid=CjwKCAjwhNWZBhB_EiwAPzlhNgbHCfzlnxP-4PmQP8T6onljOVsksJgQUzu465pbzjKle4z9WfhBQRoC-McQAvD_BwE, last downloaded on Sep. 29, 2022.

* cited by examiner

*Primary Examiner* — Huawen A Peng

(57) ABSTRACT

An example operation may include one or more of receiving, via a user interface, a feature set, querying a repository of application programming interfaces (APIs) to identify an API in the repository that corresponds to the received feature set based on a comparison of features in the feature set to features of the API stored in the repository, identifying criteria of the identified API that is published in the repository, and displaying a recommendation with the identified API including the identified criteria of the identified API via the user interface.

20 Claims, 13 Drawing Sheets

FIG. 4B

Sample API Definition 440

```
{
    "id": "uniqueAPIId",
    "title": "Sample API",
    "description": "This is a sample API.",
    "termsOfService": "http://example.com/terms/",
    "feature": {
        "name": "FeatureName",
        "description": http://www.example.com/support
    },
    "parameter": {
        "name": "ParameterName",
        "type": "parameterType",
        "inOut": "Input/Output"
    },
    "version": "1.0.1"
}
```

FIG. 4C

Sample API Vendor Registry 450

```
{
  "name": "VendorName",
  "description": "This is a sample vendor description.",
  "termsOfService": "http://example.com/terms/",
  "contact": {
    "name": "vendor Support",
    "url": "http://www.example.com/support",
    "email": "support@example.com"
  },
  "region": {
    "name": "regionName",
    "location": "region location"
  },
  "performance": {
    "accuracy": "accuracyInpercentage",
    "speed": "time"
  },
  "feature": {
    "name": "FeatureName"
  },
  "cost": {
    "price": "amount",
    "currency": "currencyName"
  }
  "cloudProvider": {
    "name": "cloudProviderName",
    "url": "http://www.example.com/support"
  },
}
```

FIG. 4E

```
              Sample Search Results 480

-- Closest Matching API Result --

481
          ↘
       {
       "ServiceName": [
              482
                ↘
           {
               "name": "VendorName1",
               "cost": {          483
                                   ↙
                   "price": "amount1",
                                       484
                   "currency": "currencyName1"
               }
               "cloudProvider": {
        485     "name": "cloudProviderName1",
         ↘     "url": "http://www.example2.com/support"
               },
               "performance": {
        486    "accuracy": "accuracyInpercentage",
         ↘     "speed": "time"
               }
           },

]
```

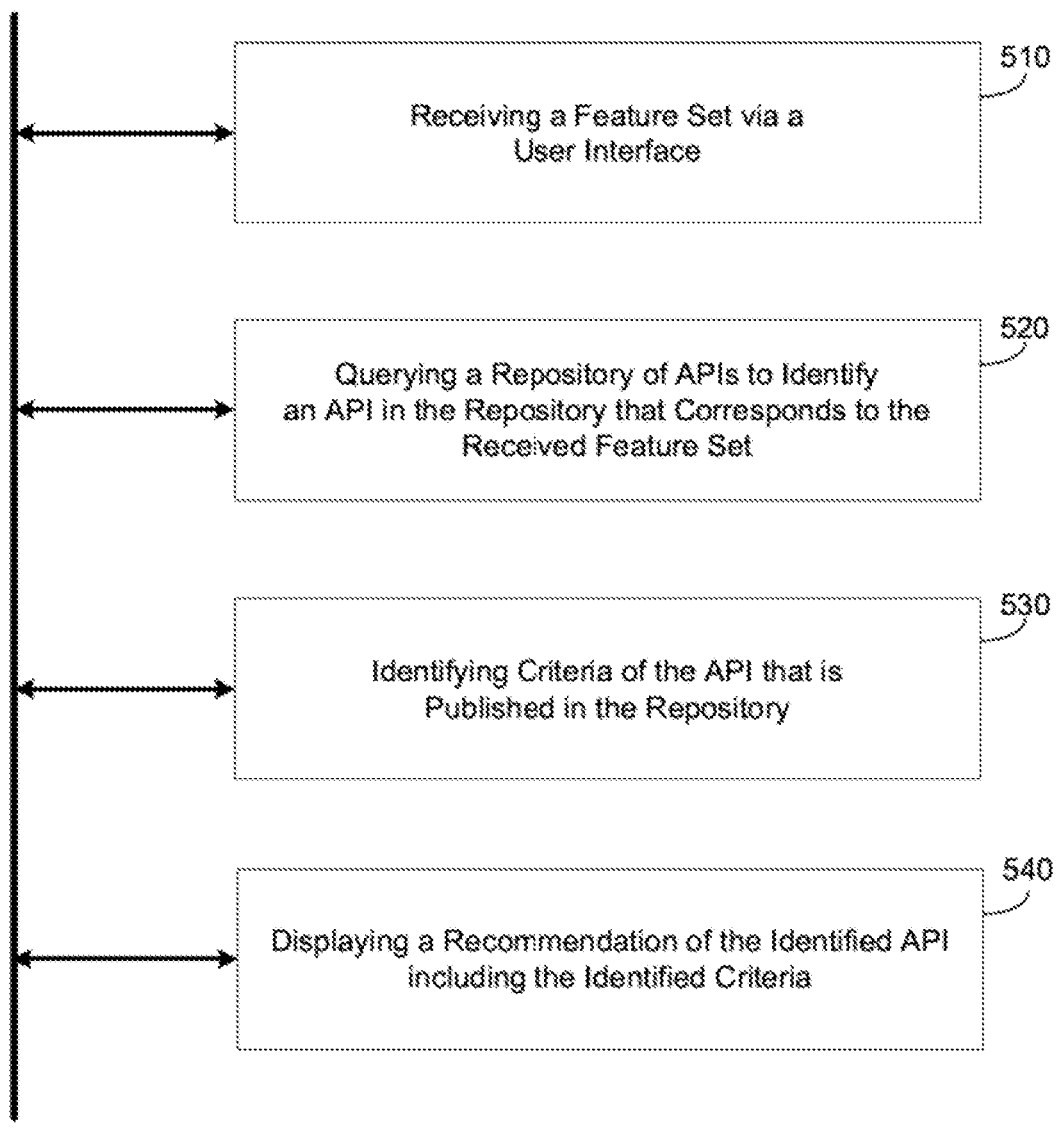

API REPOSITORY WITH SEARCHABLE FEATURE SET

BACKGROUND

In a cloud environment, services often complete their task by invoking other microservices via application programming interfaces (APIs). An API is programming code that provides an interface that enables data communication between software programs. However, obtaining enough details about an API to know that it will work for a software program can be difficult. Furthermore, there are often situations which occur where an API becomes overloaded or is temporarily unavailable. This scenario can create a cascading impact on dependent tasks for the API resulting in incomplete dependent.

SUMMARY

One example embodiment provides an apparatus that may include a network interface configured to receive, via a user interface, a feature set. The apparatus may also include a processor that may query a repository of application programming interfaces (APIs) to identify an API in the repository that corresponds to the received feature set based on a comparison of features in the feature set to features of the API stored in the repository. The processor may identify criteria of the identified API that is published in the repository. The processor may display a recommendation with the identified API including the identified criteria of the identified API via the user interface.

According to an optional embodiment, the feature set may include an identifier of one or more mandatory features, and the processor may search the APIs in the repository to identify only APIs in the repository that include the one or more mandatory features.

According to another optional embodiment, the feature set may further include an identifier of one or more optional features, and the processor may search the APIs in the repository to identify an alternative API in the repository that includes the one or more optional features instead of the mandatory feature, in response to a request via the user interface.

Another example embodiment provides a method that may include receiving, via a user interface, a feature set. The method may also include querying a repository of application programming interfaces (APIs) to identify an API in the repository that corresponds to the received feature set based on a comparison of features in the feature set to features of the API stored in the repository. The method may also include identifying criteria of the identified API that is published in the repository, and displaying a recommendation with the identified API including the identified criteria of the identified API via the user interface.

According to an optional embodiment, the feature set may include an identifier of one or more mandatory features, and the querying may include searching the APIs in the repository to identify only APIs in the repository that include the one or more mandatory features.

According to another optional embodiment, the feature set may further include an identifier of one or more optional features, and the querying may search the APIs in the repository to identify an alternative API in the repository that includes the one or more optional features instead of the mandatory feature, in response to a request via the user interface.

A further example embodiment provides a computer-readable medium comprising instructions, that when read by a processor, cause the processor to perform one or more of receiving, via a user interface, a feature set. The processor may perform querying a repository of application programming interfaces (APIs) to identify an API in the repository that corresponds to the received feature set based on a comparison of features in the feature set to features of the API stored in the repository. The processor may perform identifying criteria of the identified API that is published in the repository. The processor may perform displaying a recommendation with the identified API including the identified criteria of the identified API via the user interface.

According to an optional embodiment, the feature set may include an identifier of one or more mandatory features, and the querying may include searching the APIs in the repository to identify only APIs in the repository that include the one or more mandatory features.

According to another optional embodiment, the feature set may further include an identifier of one or more optional features, and the querying may search the APIs in the repository to identify an alternative API in the repository that includes the one or more optional features instead of the mandatory feature, in response to a request via the user interface.

BRIEF DESCRIPTION OF THE DRAWINGS

FIGS. 4A-4E are diagrams illustrating a process of searching for an API via a search engine and a central API repository, according to example embodiments.

FIG. 5 is a diagram illustrating a method of recommending an API via a search engine, according to example embodiments.

DETAILED DESCRIPTION

It is to be understood that although this disclosure includes a detailed description of cloud computing, implementation of the teachings recited herein is not limited to a cloud computing environment. Rather, embodiments of the present application are capable of being implemented in conjunction with any other type of computing environment now known or later developed.

The example embodiments are directed to a centralized application programming interface (API) repository where vendors can publish their APIs including detailed features and attributes of the respective APIs. The API repository is also coupled to a search system which provides a graphical user interface and search input mechanisms for selecting features of interest and performing a search against the APIs in the repository. The search system can identify a most-closely related API in the repository based on any number of criteria including availability, cost, location, performance, and the like and display the result(s) on the graphical user interface. During the search process, the search system can compare the search criteria against the vendor-registered details of the APIs. The result is an accurate identification of a most closely-related API based on dynamic criteria. The API repository and the API search system may be integrated within a cloud computing environment; however embodiments are not limited thereto.

Figure 1:
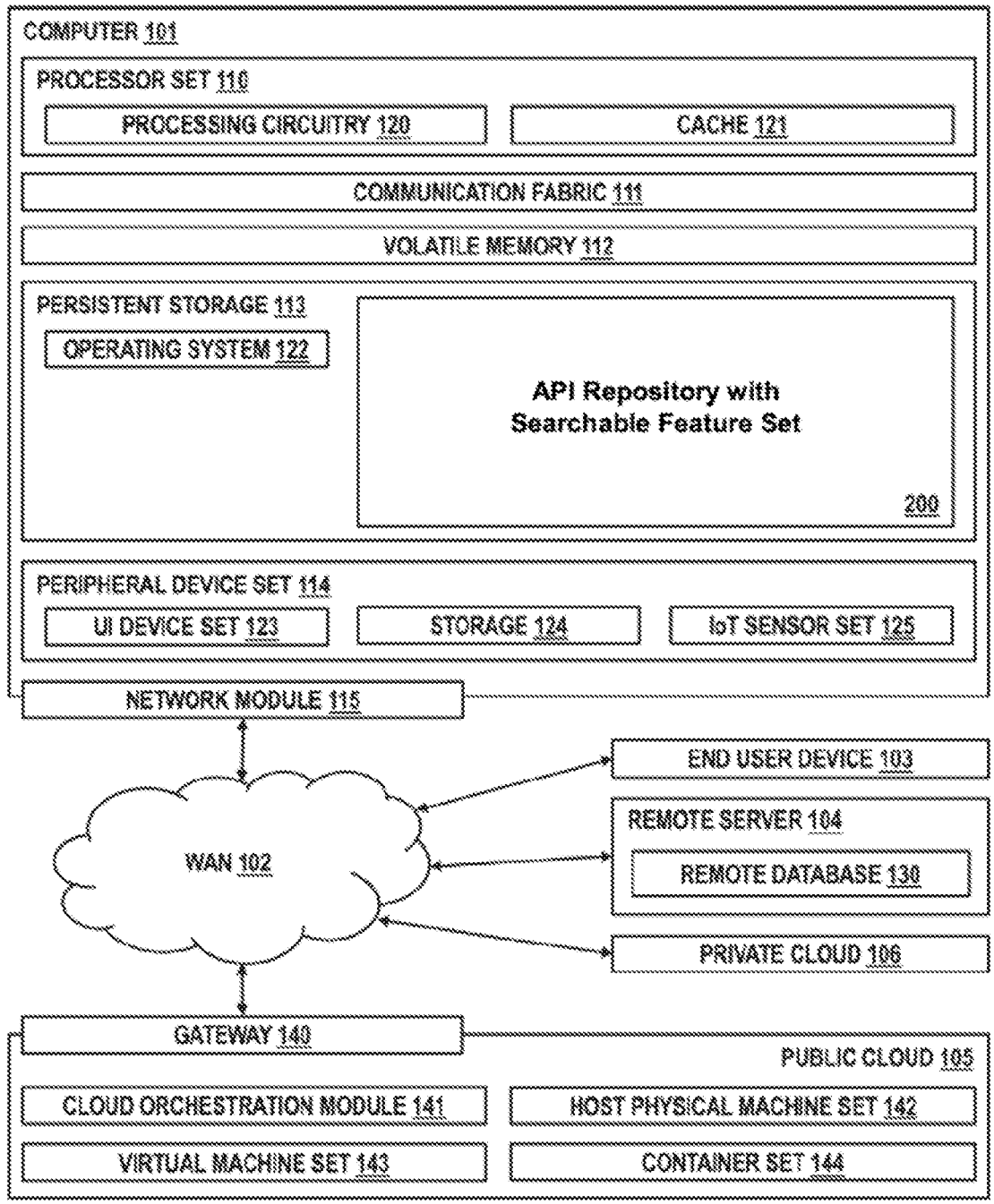
FIG. 1 is a diagram illustrating a computing environment, according to example embodiments.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the instant solution, such as an API repository with a searchable feature set 200. In addition to API repository with a searchable feature set 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and API repository with a searchable feature set 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the instant solution. In computing environment 100, at least some of the instructions for performing the instant solution may be stored in API repository with a searchable feature set 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in API repository with a searchable feature set 200 typically includes at least some of the computer code involved in performing the instant solution.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the instant solution can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 2:
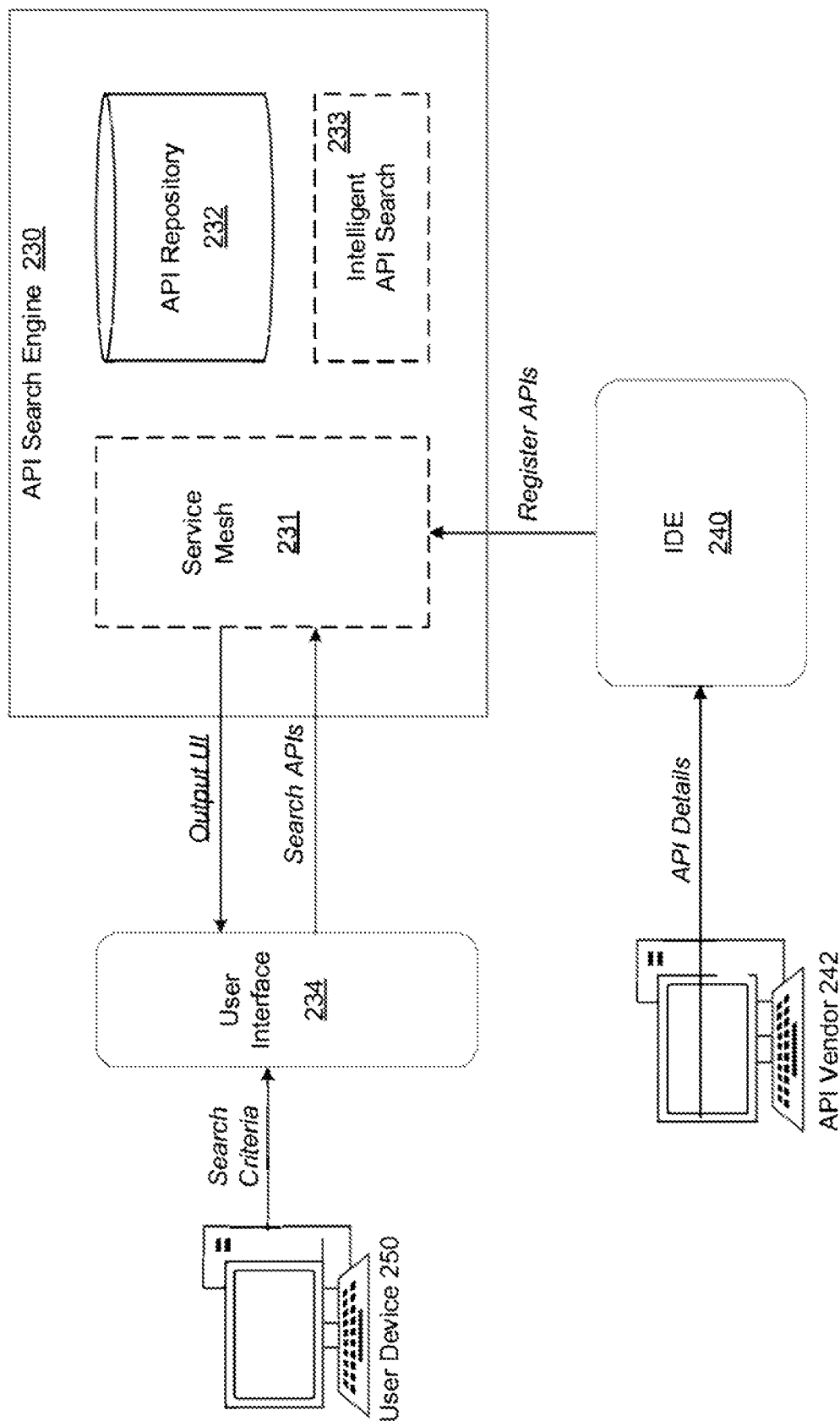
FIG. 2 is a diagram illustrating a system that includes an API repository and an API search engine, according to example embodiments.

Although not shown in FIG. 2, in addition to onboarding details about their APIs to the API repository 232, vendors may also provide a network location, URL, etc., where a status of their API can be queried by the service mesh 231. For example, the vendor may provide a live feed with details of the API published by the vendor to the API repository. The service mesh 231 may query the feed or otherwise receive the feed and keep a current and up-to-date status of the availability, cost, and features of the API within the search system 230. Thus, consumers know which APIs are currently available and which are not.

Figure 3A:
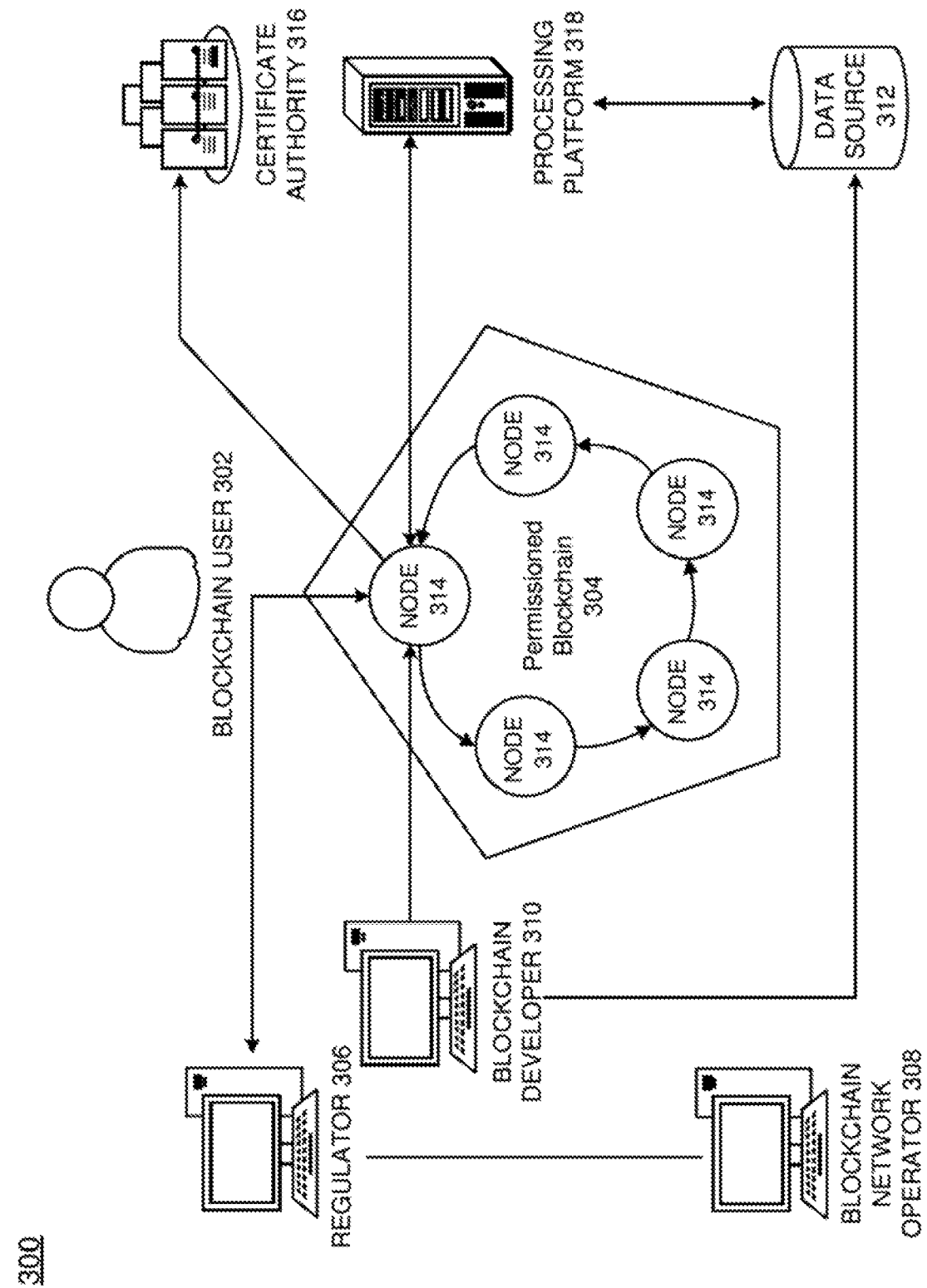
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
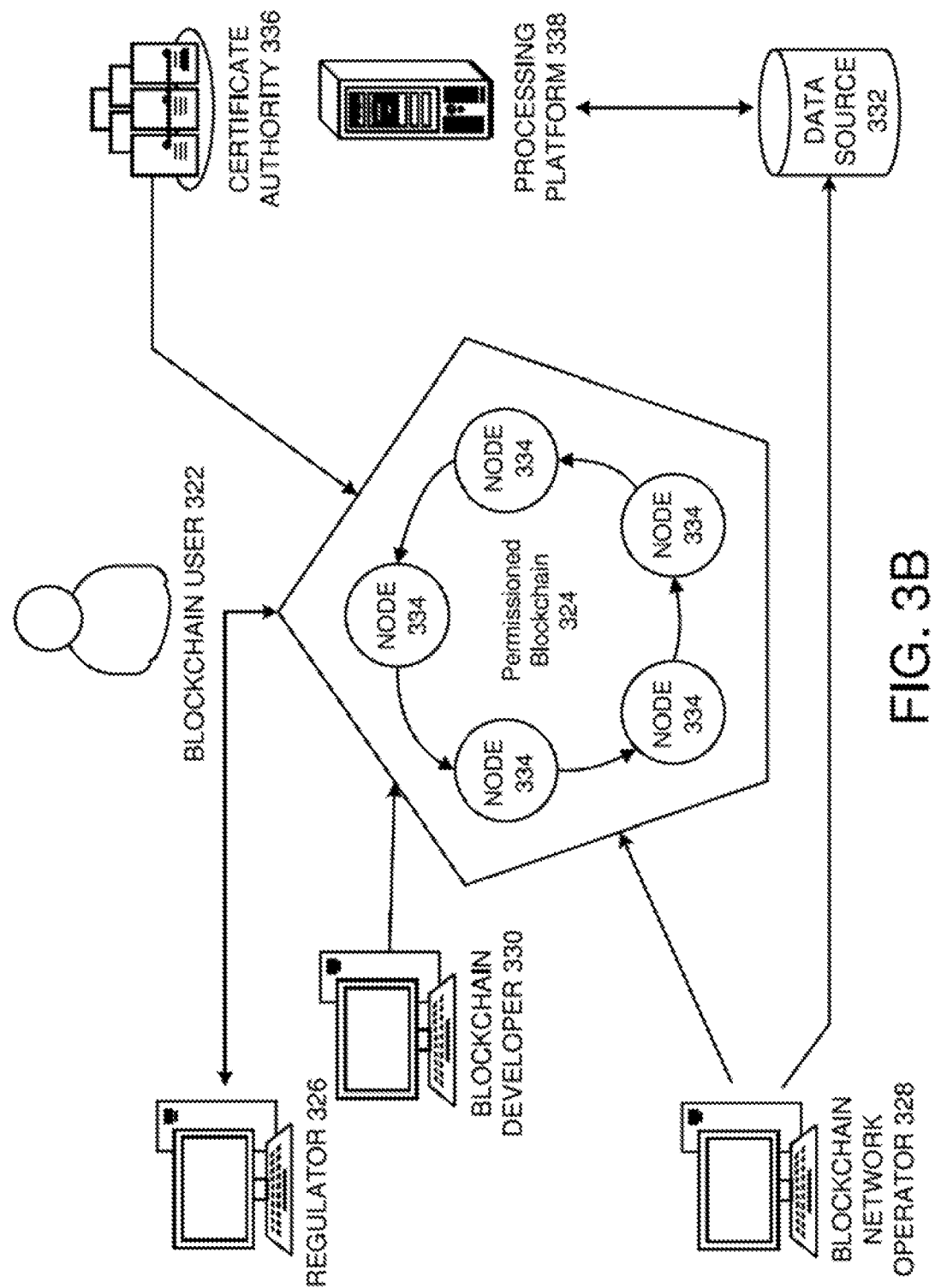
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain a user may create a personal address and begin interacting with the network by submitting transactions and hence adding entries to the ledger.

Additionally, all parties have the choice of running a node on the system and employing the mining protocols to help verify transactions.

Figure 3C:
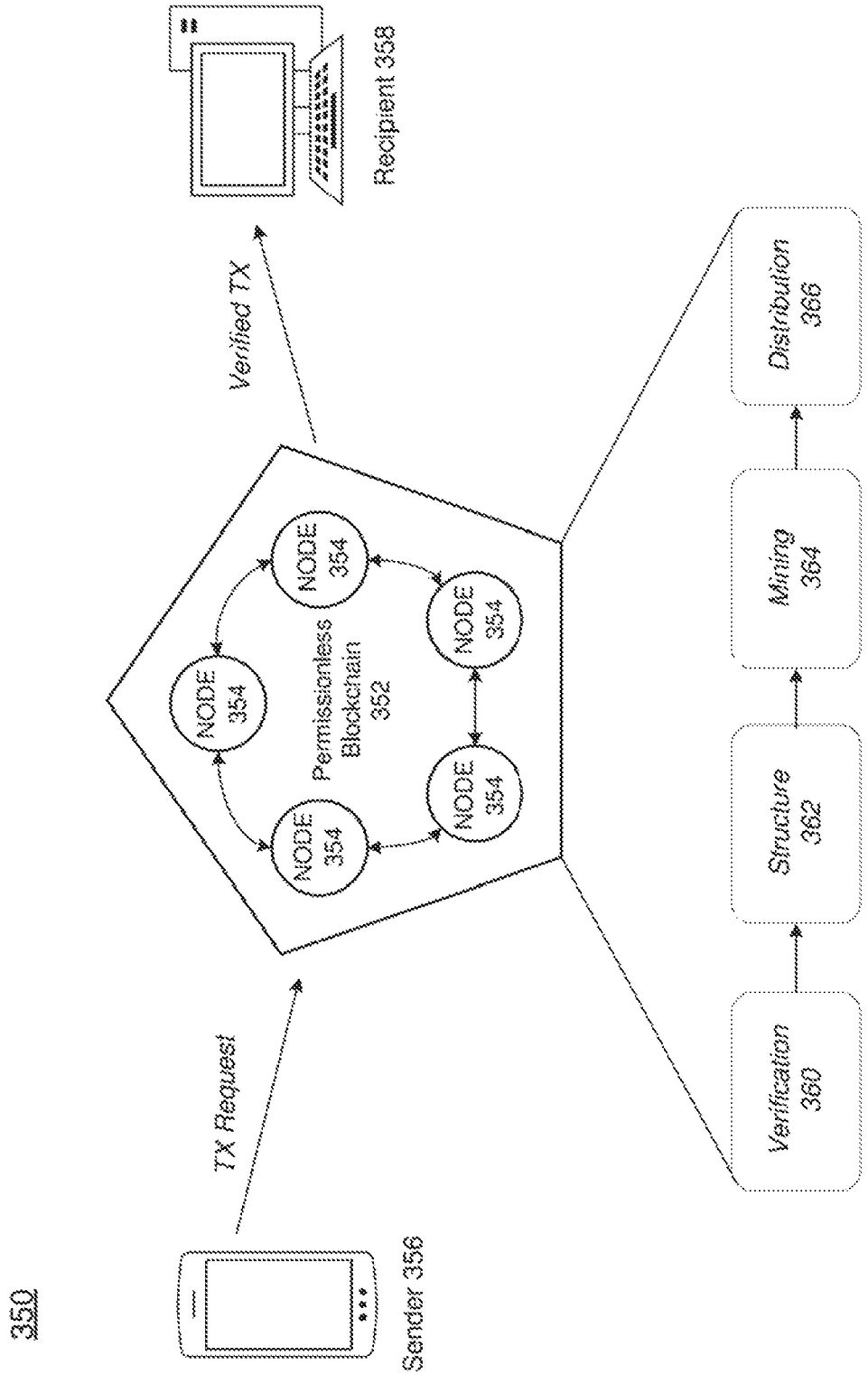
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the POW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
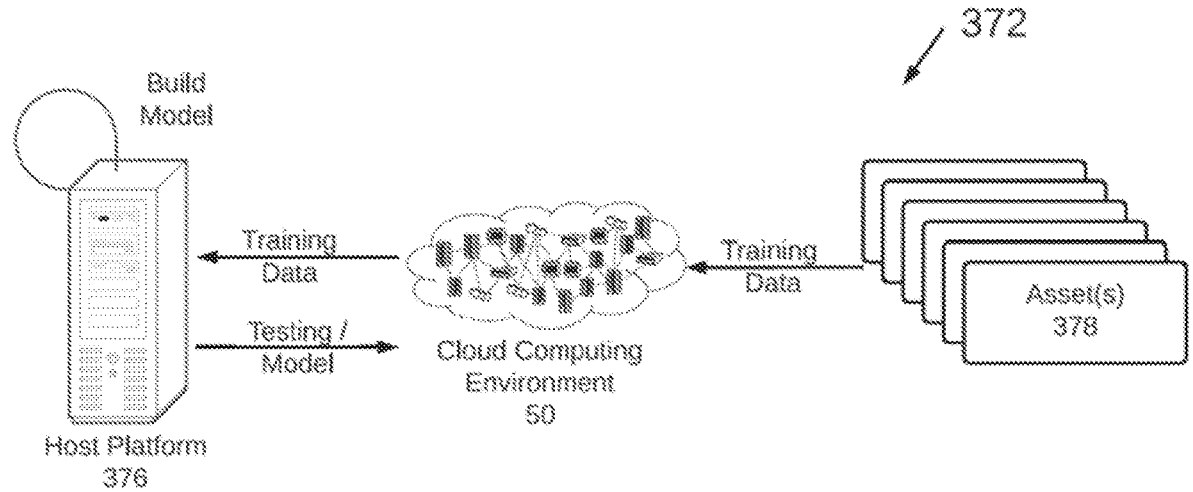
FIG. 3D is a diagram illustrating machine learning process via a cloud computing platform, according to example embodiments.
Figure 3D:
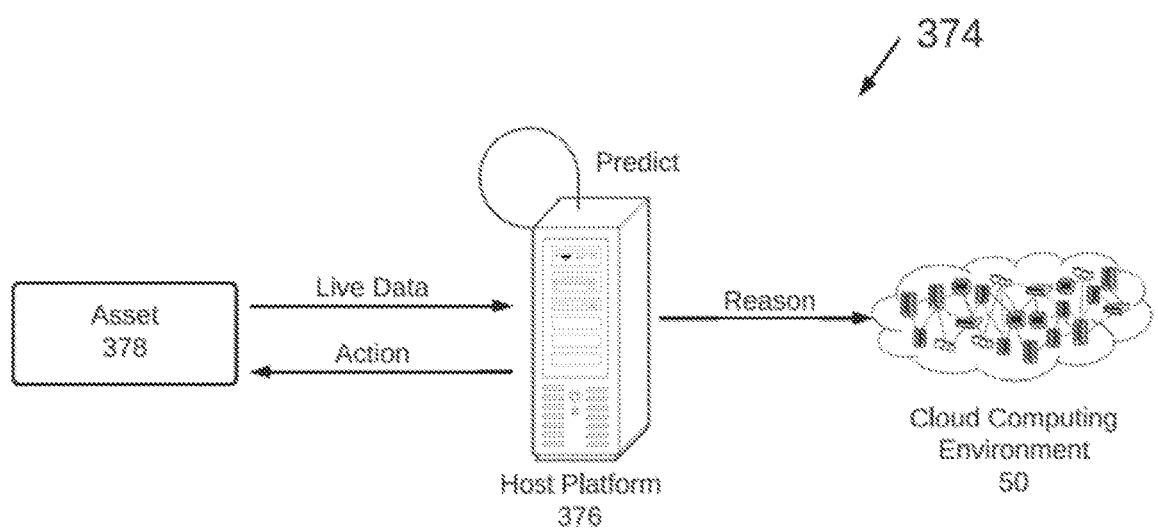
Figure 3E:
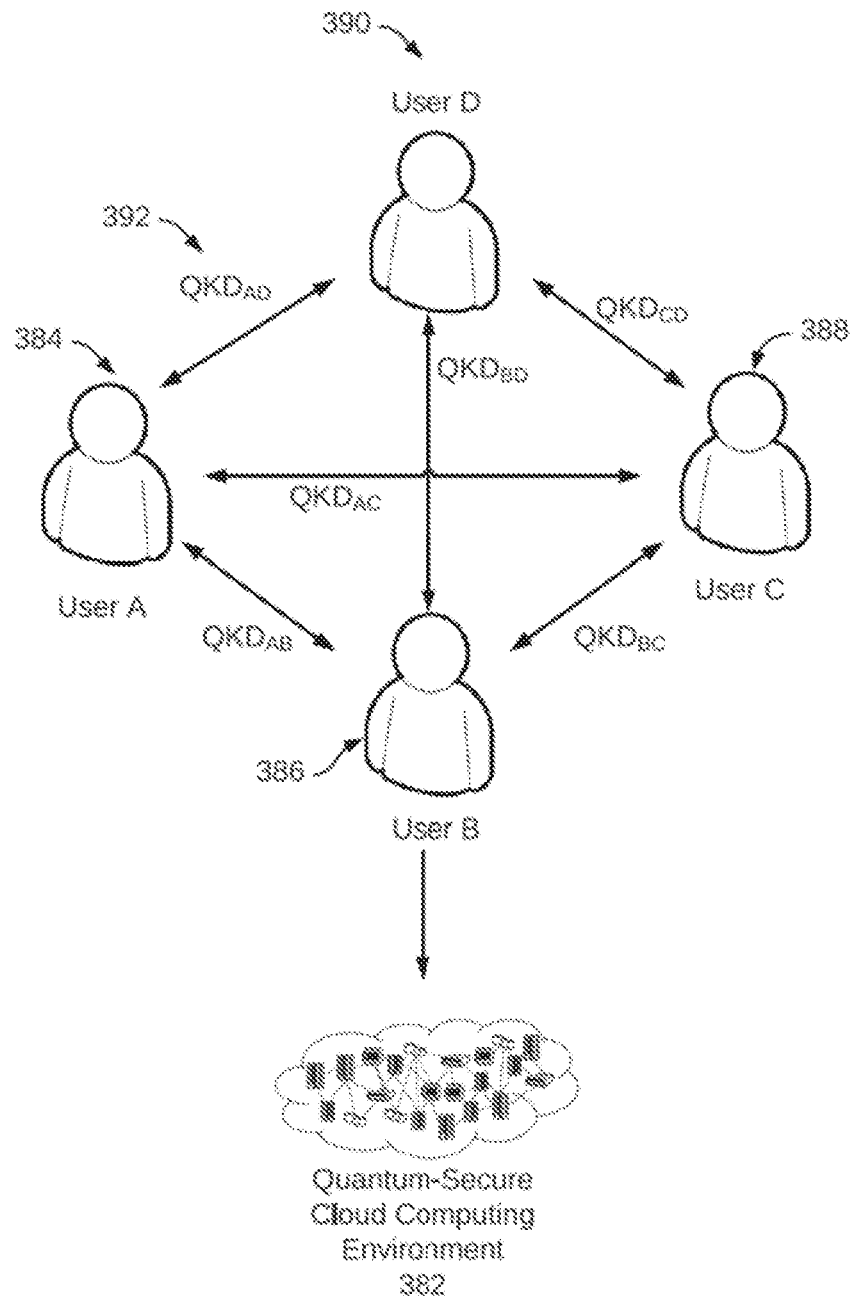
FIG. 3E is a diagram illustrating a quantum computing environment associated with a cloud computing platform, according to example embodiments.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

FIGS. 4A-4E are diagrams illustrating a process of searching for an API via a search system and a central API repository according to example embodiments. In these examples, an API search system 420 is provided and includes a service mesh 421, an API repository 422, and an intelligent API search service 423. The API search system 420 embodies a search engine capable of searching the API repository 422 for an API that is stored therein that matches requirements submitted by a consumer. The APIs that are stored within the API repository 422 may be published by vendors of the APIs.

Figure 4A:
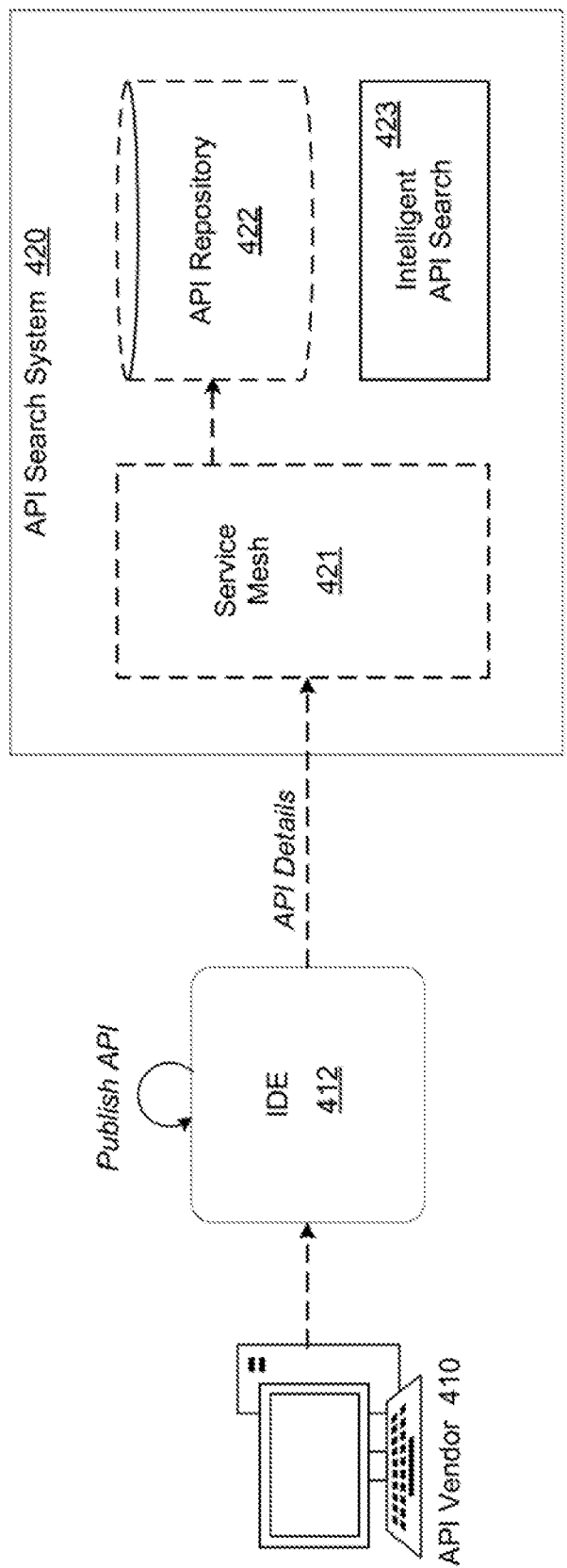

Referring to FIG. 4A, a process 400A of registering an API with the API search system 420 is shown. For example, an API vendor 410 may access an integrated development environment (IDE) 412 and publish or otherwise submit details of an API developed within the IDE 412 to the service mesh 421. For example, a workspace within the IDE 412 may include a "publish" button or the like which allows the developer to publish the API and its details to the API repository 422 via the service mesh 421. According to various embodiments, the service mesh may be enhanced to use these APIs by coding the logic to provide the exact details of search criteria based on a scenario. The API repository 422 may contain details identified from configuration files of the API which the service mesh can look up and pull into the API repository 422 including vendor details of a vendor of the API. After getting the details of API vendor, the service mesh 421 can make a call to the API. In some embodiments, the service mesh 421 can operate from within the IDE 412 with the assistance of some helper packages.

FIG. 4B illustrates an example of an API definition 440 that can be published by a vendor of an API corresponding to the API definition 440. In the example of FIG. 4B, the API definition 440 includes a unique API identifier, a title or name of the API, a description of the function(s) performed by the API, feature names, URIs with support documents, parameters, version identifiers, and the like. Each of the features within the API definition 440 may be used by the service mesh 421 when conducting a search of the API repository 422.

FIG. 4C illustrates an example of an API vendor registry 450 that can be published by a vendor of an API. The API vendor registry 450 may include details of the vendor, the region, the performance attributes, the cost attributes, feature names, terms of service, contact information, cloud provider information, and the like. Each of the features within the API vendor registry 450 may be used by the service mesh 421 when conducting a search of the API repository 422.

Figure 4D:
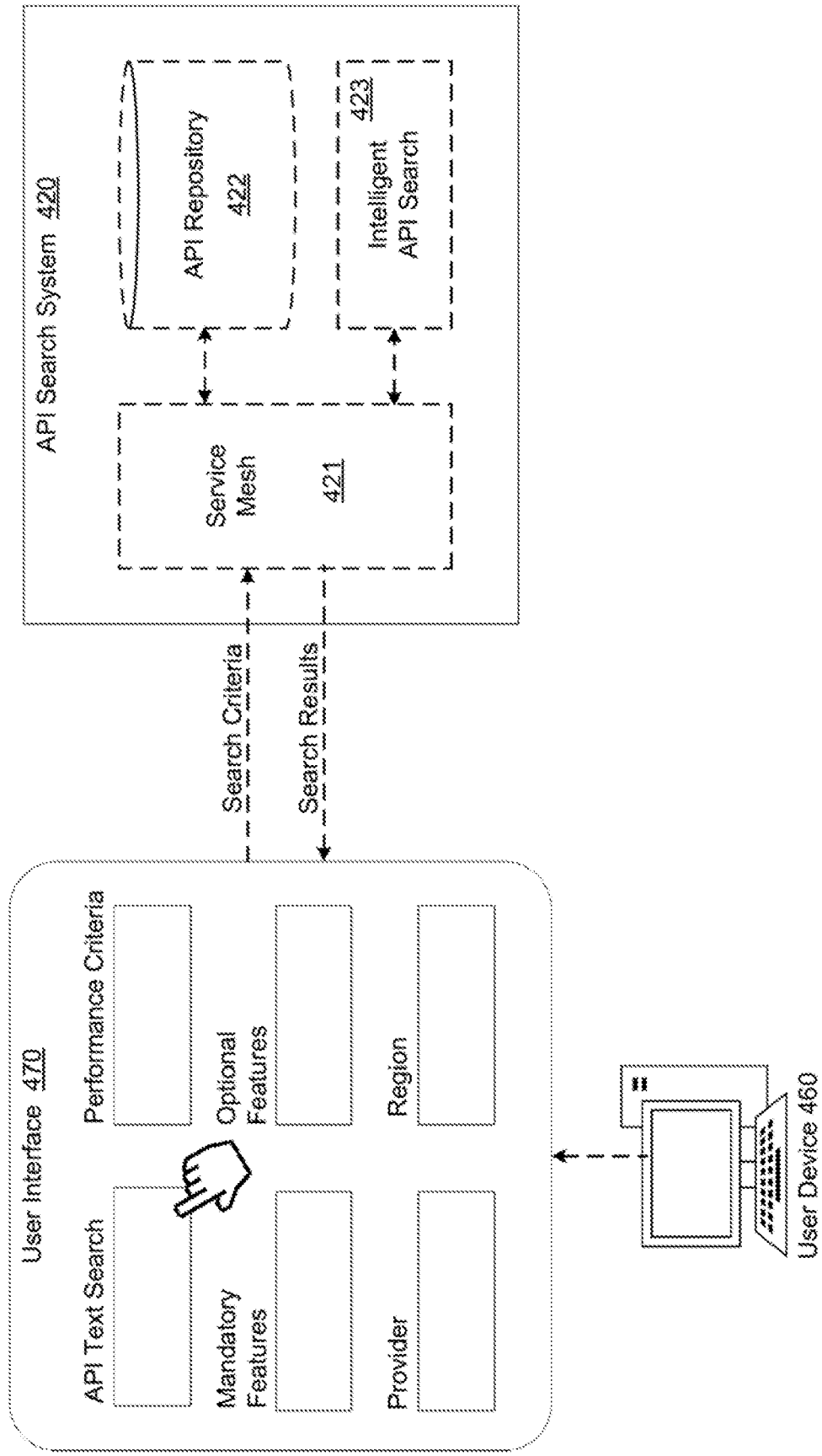

FIG. 4D illustrates a process 400B of searching the API repository 422 for a matching API based on search criteria submitted by a user device 460 via a user interface 470 according to various embodiments. For example, the user interface 470 may be output within a software application, a progressive web application, a service, or the like. The user interface may include various buttons, menus, icons, checkboxes, and the like, for selecting features that are to be used to search for an API in the API repository 422. Examples of the search features include API text content such as words or other text that may be included in a name of the API. Search features can also include performance criteria/requirements, mandatory features that are performed by the API such as providing weather for a month in the future, etc. Other search features include optional features that are not mandatory but which can be used to find alternative APIs should a default or best-case scenario API not exist or be unavailable. Other search features include cloud provider information, location/region information, cost, performance, and the like.

The criteria entered into the user interface 470 may be submitted to the service mesh 421 in response to a submission by a user, etc. The service mesh 421 may receive the content from the user interface 470, parse it, and compare it to the features of the APIs that are contained in the API repository 422. The service mesh 421 can identify a matching API or multiple matching APIs and provide them back to the user via the user interface 470. In an example in which the service mesh 421 finds multiple matching APIs, the service mesh 421 may rank the APIs in comparison to each other based on an attribute that each of the APIs include such as a cost attribute, a performance attribute, a location attribute, an availability attribute, and the like. Furthermore, an intelligent API search 423 may analyze the APIs stored in the API repository 422 to identify alternative APIs that are not exact matches but which are close enough that they can perform the job minus one or a few required features.

FIG. 4E illustrates a user interface 480 with a search result generated from the search performed in FIG. 4D. Here, the search result includes an API along with features 481, 482, 483, 484, 485, and 486 of the API. The features 481-486 may include availability, cost, performance, feature information, vendor information, location information, API names, and the like.

FIG. 5 illustrates a method 500 of recommending an API via a search engine according to example embodiments. For example, the method may be performed by a cloud platform, a web server, an on-premises server, a distributed system, or the like. Referring to FIG. 5, in 510, the method may include receiving, via a user interface, a feature set. The feature set may include a list of features that are desired by the user/developer searching for the API.

In 520, the method may include querying a repository of application programming interfaces (APIs) to identify an API in the repository that corresponds to the received feature set based on a comparison of features in the feature set to features of the API stored in the repository. In 530, the method may include identifying criteria of the identified API that is published in the repository. In 540, the method may include displaying a recommendation with the identified API including the identified criteria of the identified API via the user interface.

In some embodiments, the feature set may include an identifier of one or more mandatory features, and the querying comprises searching the APIs in the repository to identify only APIs in the repository that include the one or more mandatory features. In some embodiments, the feature set may further include an identifier of one or more optional features, and the querying further comprises searching the APIs in the repository to identify an alternative API in the repository that includes the one or more optional features instead of the mandatory feature, in response to a request via the user interface.

In some embodiments, the method may further include displaying a registration user interface and receiving, via the registration user interface, registration details of APIs from vendors including vendor details and API performance details. In some embodiments, the registration details of an API may include a definition of the API and a vendor registry of a vendor of the API. In some embodiments, the querying may include identifying a plurality of APIs in the repository that correspond to the feature set, ranking the plurality of APIs based on a value of a predefined attribute included in the plurality of APIs in the repository, and displaying the plurality of APIs arranged in an order based on the ranking via the user interface. In some embodiments, the querying may include submitting respective API calls to a plurality of APIs stored in the repository and receiving features of the plurality of APIs from the repository in response to the respective API calls.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
a network interface configured to receive, via a user interface of a search engine, search criteria including a feature set; and
a processor configured to:
query a repository of application programming interfaces (APIs) to identify an API in the repository that matches the feature set based on a comparison of a description of features in the feature set to a description of functions performed by the API which have been published to the repository;
identify a name of the API and attributes of the API which have been published to the repository; and
display the name of the API and the attributes of the API as search results of the search engine via the user interface.

2. The apparatus of claim 1, wherein the feature set comprises an identifier of one or more mandatory features, and the processor is configured to search the APIs in the repository to identify only APIs in the repository that include the one or more mandatory features.

3. The apparatus of claim 1, wherein the feature set further comprises an identifier of one or more optional features, and the processor is further configured to search the APIs in the repository to identify an alternative API in the repository that includes the one or more optional features, in response to a request via the user interface.

4. The apparatus of claim 1, wherein the processor is further configured to display a registration user interface and receive, via the registration user interface, registration details of the APIs.

5. The apparatus of claim 4, wherein the registration details of the APIs comprise a definition of the API and a vendor registry of a vendor of the API, respectively.

6. The apparatus of claim 1, wherein the processor is configured to identify a plurality of APIs stored in the repository that match the description of features in the feature set, rank the plurality of APIs based on a value of a predefined attribute included in the plurality of APIs which have been published to the repository, and display attributes of the plurality of APIs arranged in an order based on the ranking via the user interface.

7. The apparatus of claim 1, wherein the processor is configured to submit respective API calls to a plurality of APIs stored in the repository and receive features of the plurality of APIs from the repository in response to the respective API calls.

8. A method comprising:
receiving, via a user interface of a search engine, a search criteria including a feature set;
querying a repository of application programming interfaces (APIs) to identify an API in the repository that matches the feature set based on a comparison of a description of features in the feature set to a description of functions performed by the API which have been published to the repository;
identifying a name of the API and attributes of the API which have been published to the repository; and
displaying the name of the API and attributes of the API as search results of the search engine via the user interface.

9. The method of claim 8, wherein the feature set comprises an identifier of one or more mandatory features, and the querying comprises searching the APIs in the repository to identify only APIs in the repository that include the one or more mandatory features.

10. The method of claim 8, wherein the feature set further comprises an identifier of one or more optional features, and the querying further comprises searching the APIs in the repository to identify an alternative API in the repository that includes the one or more optional features, in response to a request via the user interface.

11. The method of claim 8, wherein the method further comprises displaying a registration user interface and receive, via the registration user interface, registration details of the APIs.

12. The method of claim 11, wherein the registration details of the APIs comprise a definition of the API and a vendor registry of a vendor of the API.

13. The method of claim 8, wherein the querying comprises identifying a plurality of APIs stored in the repository that match the description of features in the feature set, ranking the plurality of APIs based on a value of a predefined attribute included in the plurality of APIs which have been published to the repository, and displaying attributes of the plurality of APIs arranged in an order based on the ranking via the user interface.

14. The method of claim 8, wherein the querying comprises submitting respective API calls to a plurality of APIs stored in the repository and receiving features of the plurality of APIs from the repository in response to the respective API calls.

15. A computer-readable storage medium comprising instructions, that when read by a processor, cause the processor to perform a method comprising:
receiving, via a user interface of a search engine, search criteria including a feature set;

querying a repository of application programming interfaces (APIs) to identify an API in the repository that matches the feature set based on a comparison of a description of features in the feature set to a description of functions performed by the API which have been published to the repository;

identifying a name of the API and attributes of the API which have been published to the repository; and displaying the name of the API and attributes of the API as search results of the search engine via the user interface.

16. The computer-readable storage medium of claim 15, wherein the feature set comprises an identifier of one or more mandatory features, and the querying comprises searching the APIs in the repository to identify only APIs in the repository that include the one or more mandatory features.

17. The computer-readable storage medium of claim 15, wherein the feature set further comprises an identifier of one or more optional features, and the querying further comprises searching the APIs in the repository to identify an alternative API in the repository that includes the one or more optional features, in response to a request via the user interface.

18. The computer-readable storage medium of claim 15, wherein the method further comprises displaying a registration user interface and receive, via the registration user interface, registration details of the APIs.

19. The computer-readable storage medium of claim 15, wherein the querying comprises identifying a plurality of APIs in the repository that matches the description of features in the feature set, ranking the plurality of APIs based on a value of a predefined attribute included in the plurality of APIs which have been published to the repository, and displaying the plurality of APIs arranged in an order based on the ranking via the user interface.

20. The computer-readable storage medium of claim 15, wherein the querying comprises submitting respective API calls to a plurality_of APIs stored in the repository and receiving features of the plurality of APIs from the repository in response to the respective API calls.

* * * * *